United States Patent [19]
Cox et al.

[11] Patent Number: 5,850,531
[45] Date of Patent: Dec. 15, 1998

[54] METHOD AND APPARATUS FOR A SLIDER

[75] Inventors: Kenneth Charles Cox; Stephen Gregory Eick, both of Naperville, Ill.; Dianne Kyra Hackborn, Corvallis, Oreg.; Amy Ruth Ward, Claremont, Calif.

[73] Assignee: Lucent Technologies Inc., Murray Hill, N.J.

[21] Appl. No.: 572,979

[22] Filed: Dec. 15, 1995

[51] Int. Cl.⁶ .................................................. G06F 3/00
[52] U.S. Cl. ......................... 345/349; 345/340; 345/974
[58] Field of Search ................................. 395/399, 398, 395/339, 326, 340, 333, 348, 349, 328, 338, 341, 342, 343, 344, 345, 346, 347

[56] References Cited

U.S. PATENT DOCUMENTS

| | | | |
|---|---|---|---|
| 5,485,600 | 1/1996 | Joseph et al. .............................. | 395/500 |
| 5,491,782 | 2/1996 | King et al. ................................ | 395/349 |
| 5,553,227 | 9/1996 | Berry ........................................ | 395/349 |
| 5,555,370 | 9/1996 | Li et al. .................................... | 395/348 |
| 5,557,730 | 9/1996 | Frid-Nielsen ............................. | 395/349 |
| 5,559,301 | 9/1996 | Bryan, Jr. et al. ........................ | 395/348 |

*Primary Examiner*—Raymond J. Bayerl
*Assistant Examiner*—Steven P. Sax
*Attorney, Agent, or Firm*—Jack R. Penrod

[57] ABSTRACT

A system that has a graphical user interface (GUI) that allows a user to readily define and manipulate a transform function from one attribute, such as numerical value, to another attribute that is more understandable by by the user such as color, size or location. Special two thumb slider controls provide the transform functions. The two thumbs define break points for piecewise linear transform ranges. Further, the center transform range can be manipulated as a unit to show the user what happens if the range is maintained essentially constant but the break points are varied. The aid to visualizing characteristics otherwise hidden in large data sets, such as a monthly telephone bill of a large corporation, is very beneficial.

15 Claims, 7 Drawing Sheets

METHOD AND APPARATUS FOR A SLIDER

TECHNICAL FIELD

The invention relates to computers and more particularly to a method and apparatus for human interaction with data to analyze and extract important hidden attributes in the data.

DESCRIPTION OF THE PROBLEM

Data, such as telecommunication billing records of a large corporation, can be so overwhelming that it can defy meaningful examination unless powerful statistical systems and applications are brought in to deal with the task. The cost for an individual company to develop and operate a statistics analysis system to analyze such data historically has been repressively high. There is a need therefore to have analysis tools that would assist a human decision maker visually analyze such data in order to find significant data items and trends with a data base. Such a tool could be used to analyze any data base problems, but especially to analyze cost anomalies in telecommunications and high telecommunications usage areas for possible discount negotiations.

Known data analysis and visualization systems and tools with even a small degree of data base capability have be popular with personal computer users. Lotus 1-2-3® and Microsoft EXCEL® are widely used because of their respective analysis and graphing, i.e. simple visualization, capabilities. However, to carefully analyze a large data base, one or more better tools are needed to assist the user in interacting with the data to reveal hidden characteristics buried therein. One tool that has helped users interact with data is the slider control. Typically a slider control provides some type of adjustment over a range. The slider control, which is present on most graphical user interfaces (GUIs), is a metaphor for a volume control on some of the modern audio equipment that has a slidable wiper. With a slider control, variations can be made within the entire slider range, i.e. 0% to 100% of maximum. Such known slider controls have been used in GUIs by B. Shneiderman in the Dynamic Home Finder; and by R. Spence et al. in Visualization for Functional Design. Further, a slider control of R. Spence et al. helps analysis a little bit more by allowing the user to interactively set a range within a larger range over which functional calculations will be performed by the associated computer or workstation to obtain a range of results, which in that case is a set of numbers representing circuit operating characteristics.

While these known GUI sliders represent steps in the right direction, it is still desirable to have GUI slider controls that provide the user with even greater manipulation/adjustment flexibility and enhanced visualization of features of the data in the data base.

It is an object of this invention to provide a method and apparatus for a user to interactively adjust ranges of interest of a displayed characteristic of a data base and to immediately observe the results of adjustment.

It is another object of this invention to provide a method and apparatus for a user to interactively select data subsets of the database for closer observation of characteristics.

SUMMARY OF THE INVENTION

Briefly stated, the aforementioned objects are achieved by providing an system for interactively transforming data according to manipulation by a human operator. The system includes a computer having a pointing device and a graphical user interface. The graphical user interface has a data display region for displaying data according to a predetermined parameter and a slider control. The slider control has a first range which is mapped to the length of the slider control. The slider control also has two adjustable limits within the first range which together define a second range. Each of these adjustable limits is individually adjustable through the use of the pointing device. The second range maps the predetermined parameter to a second parameter. This second range is movable within the first range by selecting and dragging the second range along the first range, and the movement of the second range changes the transform characteristics of the predetermined parameter into the second parameter. Such changes in the transform characteristics allows the user to observe characteristics of the data from many perspectives in substantially real time.

In another aspect of the invention, the aforementioned objects are achieved by providing a method for a piecewise linear mapping of data which has a first parameter to data which has a second parameter using a slider control. This method includes setting an upper limit with a first thumb of the slider control and mapping all values of the first parameter that are greater than the upper limit to an upper attribute of the second parameter. A lower limit is also set with a second thumb of said slider control and all values of the first parameter less than the lower limit are mapped to a lower attribute of the second parameter. All values of the first parameter between upper limit and the lower limit are mapped according to a transform function to a range of attributes of the second parameter.

DETAILED DESCRIPTION

Figure 1:
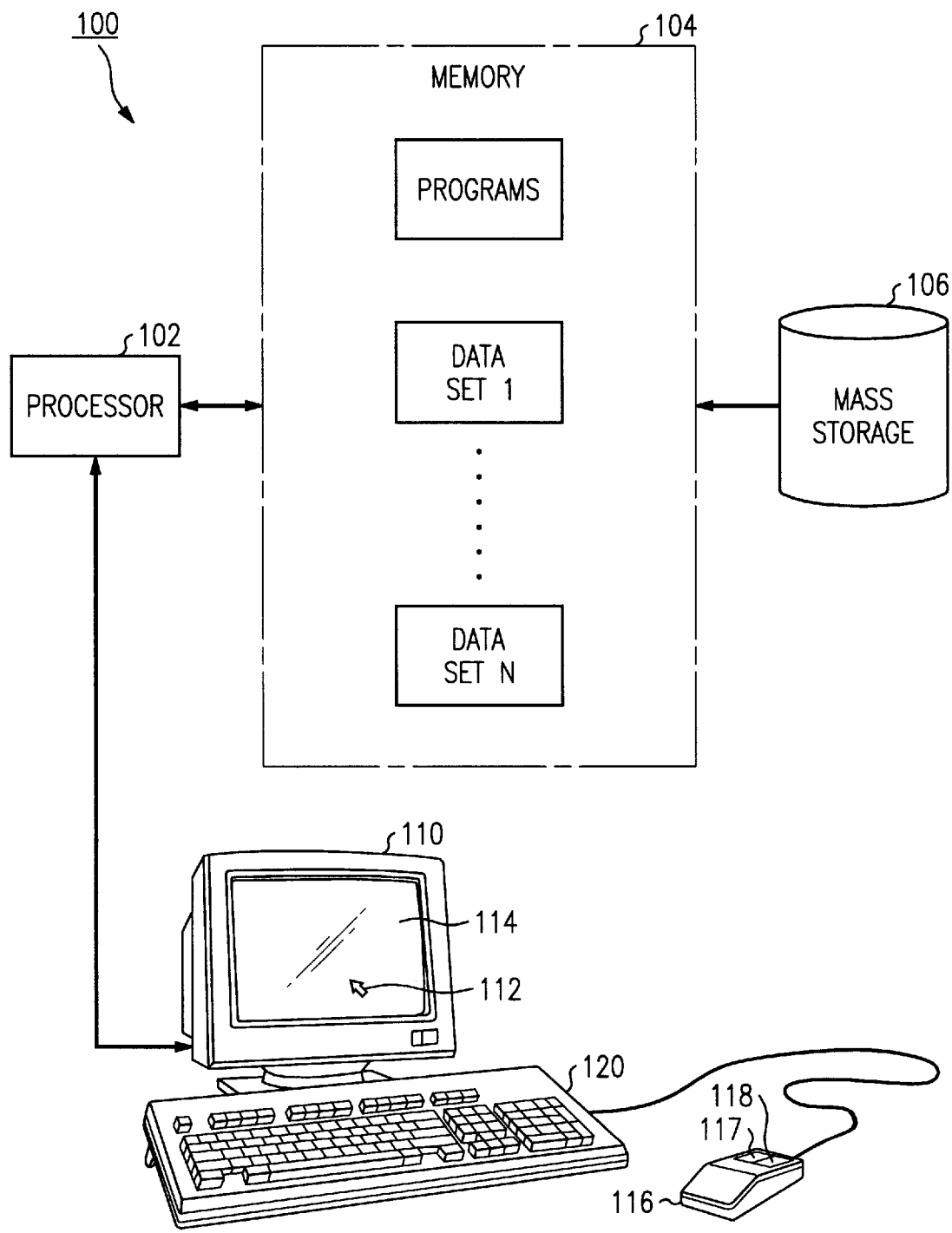
FIG. 1 is a diagram of a system for displaying a GUI according to the present invention.

Referring now to FIG. 1, a system 100 is shown. System 100 should be at least a high powered personal computer or a work station of at least equivalent capabilities. System 100 has a processor 102 which processes data according to procedural instructions. Processor 102 is connected to memory 104 and to mass storage unit 106. Mass storage unit 106 and memory 104 store programs that provide the procedural instructions followed by the processor 102 and store data that is processed according to those programs. One such program is a graphical user interface (GUI) shown in FIG. 2 and discussed below. Processor 102 is also connected to display 110, which preferably is a color display having a resolution of at least 640 pixels by 400 pixels. The GUI program operates with a cursor program which moves a cursor 112. Cursor 112 is directed to various locations on the screen 114 of the display 110 by pointing device 116, such as a mouse, trackball or joystick. Pointing device 116 has buttons 117 and 118 which are clickable by a user in order to interact and select interactive regions of the GUI. The system 100 also has a keyboard 120 which may be used by a user to input alpha-numeric and other keyboard enterable information.

Figure 2:
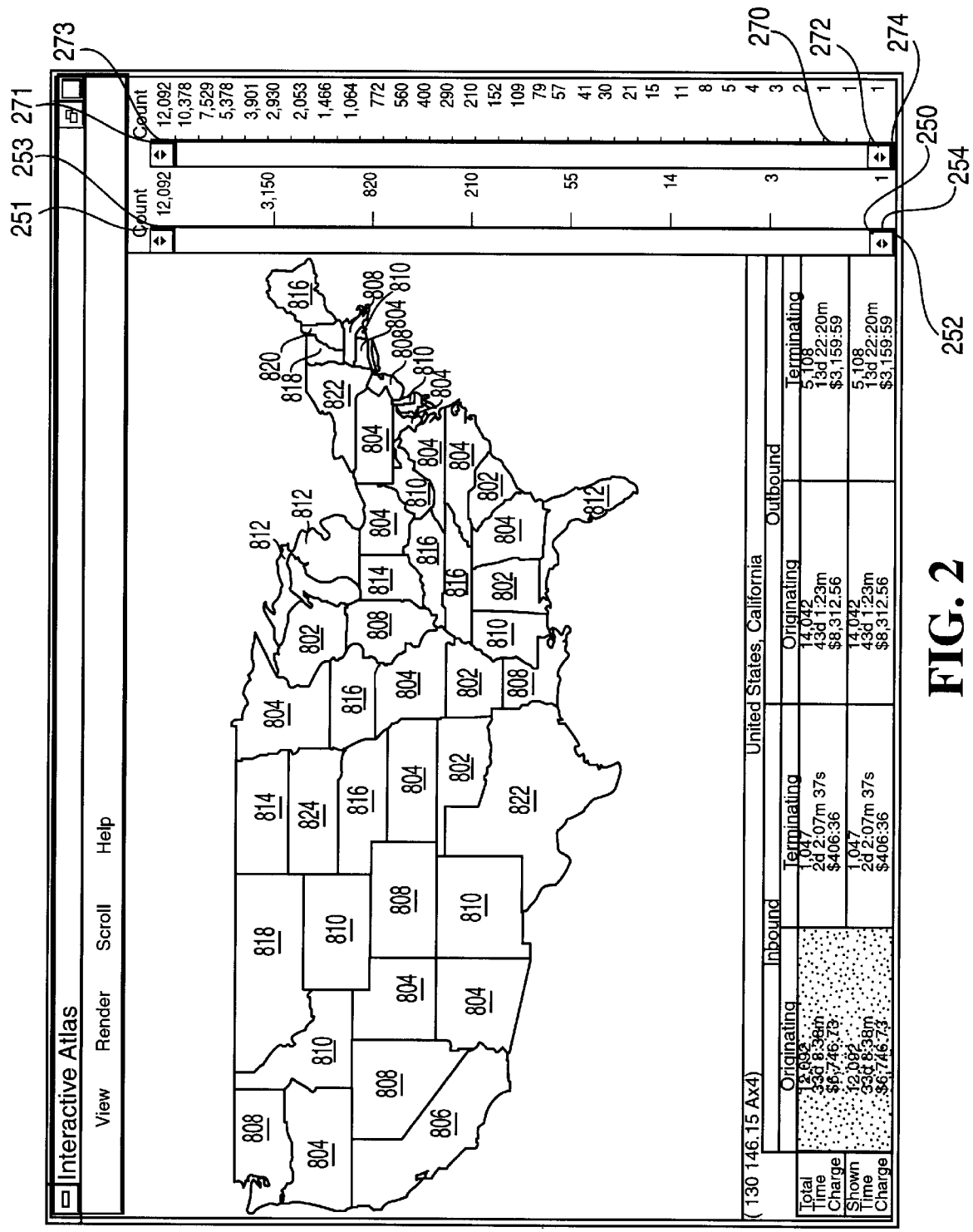
FIG. 2 illustrates a GUI that is useful for explaining the invention of an extensible event-action system.

Referring now to FIG. 2, a display 200 of a GUI application entitled SeeBill is shown. Those in the art will appreciate that the displayed portion of any GUI application is only part of the user interface. The coordination of the cursor (cursor 112 in FIG. 1) with the pointing device (pointing device 116 in FIG. 1) and the interactive regions of the GUI display 200 are another part. A geographic window 210 has geographic regions shown therein. The geographic regions, for example, each state, the country of Canada and the country of Mexico, are interactive regions of the GUI display 200. In FIG. 2, California has been selected as indicated by a lightened color around its border. The name California is given on the data bar 220, which is immediately beneath the geographic window 210. Below the data bar 220 is the details window 230. Details window 230 provides more detailed information on the region currently highlighted by the geographic window 210. This detailed information includes summary information on the inbound and out-bound calls which terminated or originated within the region. The top line of numbers show the total calls made in the region, while the bottom row shows the calls of the currently selected user types. In addition, the user may press pointing device button 117 within one of the four details (inbound originating and terminating, outbound originating and terminating) to select it as the call data being displayed by the geographic window 210.

Display 200 also has range controls 250 and 270 located along the right side of thereof. First ends 251, 271 and second ends 252, 272 which represent the maximum and minimum values of the range of sliders 250 and 270 respectively. These controls 250, 270 are a special type of slider controls. A standard slider has two end points or limits and a thumb which is moveable between the two end points to provide a value that is proportional according to some scale to the location of the thumb between the two end points. The scroll bar, which is common in text/word processing applications, is an example of a linear scale slider. Manipulation of the thumb one third from the end point representing the beginning of a document moves the text that is one third of the way down from the beginning onto the display of such an application (not shown). Sliders simulating linear volume controls on audio equipment are another common usage of sliders in GUIs, the difference here being that for audio applications a logarithmic scale is sometimes used.

Controls 250, 270 are special in that each control has two thumbs 253, 254 and 273, 274 respectively. The two thumbs 253, 254 and 273, 274 may be moved/manipulated by means of the pointing device 116 toward or apart from each other along the range of controls 250, 270 respectively. The pairs of thumbs 253, 254 and 273, 274 provide two break points within the range of their respective control 250, 270. The two break points for each control are set by the user with pointing device 116. The two break points define three sub-ranges where the transform function from one parameter of the data to another parameter, such as a visual attribute, may be defined differently.

The controls 250, 270 do provide for finer control over the data being displayed by interaction with the interactive regions of the geographic window 210. By adjusting the upper thumbs 253, 273 and the bottom thumbs 254, 274, the scale of the geographic regions' sizes (control 250) and colors (control 270) are selected, respectively.

Figure 3:
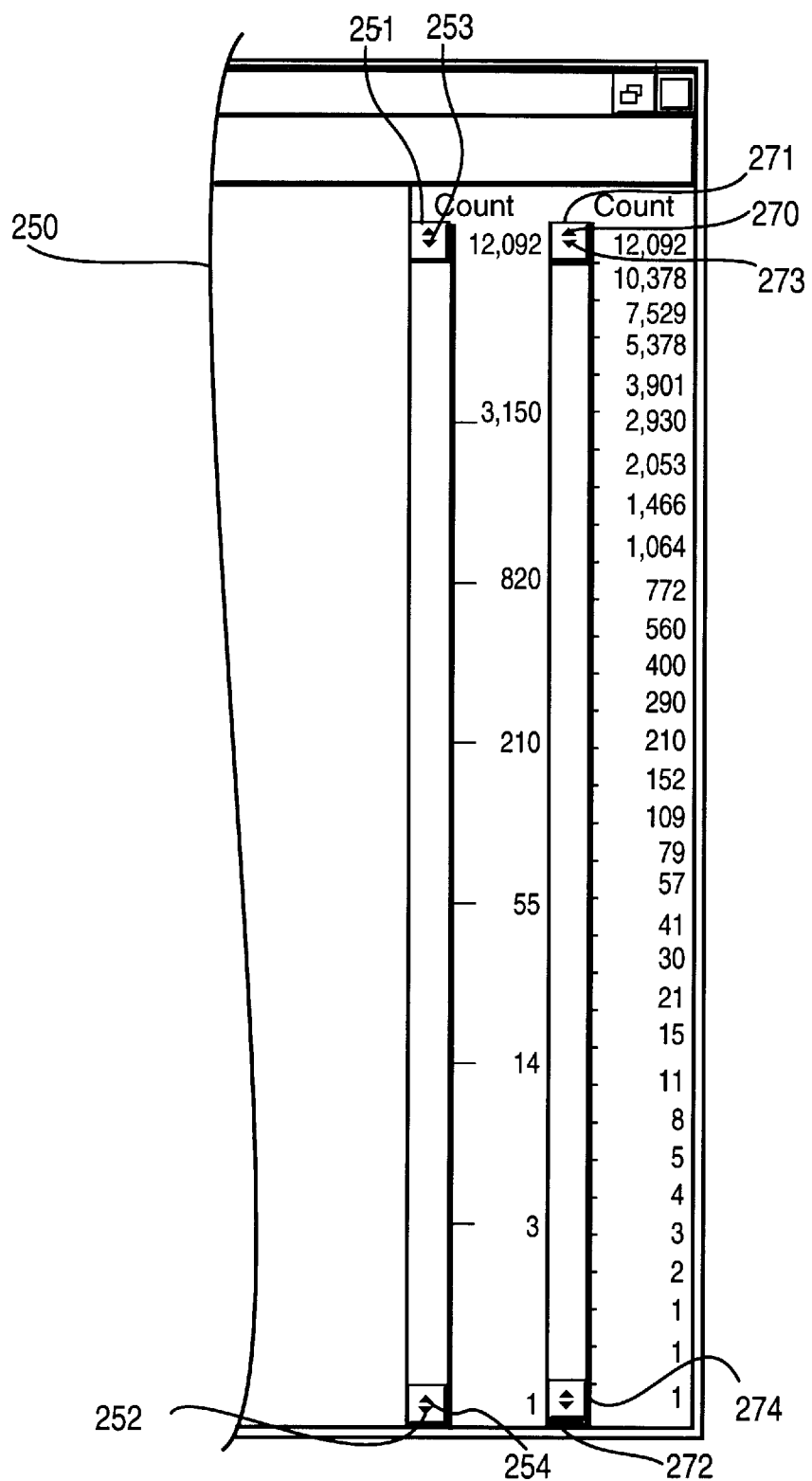
FIG. 3 is a detailed view of the slider control portion of FIG. 2 a preferred embodiment.

FIG. 3 shows a close-up of the size control 250 and the color control 270. On the right side of each of the controls 250, 270 is a scale which is scaled logarithmically to the data values being displayed. Gradation ticks are provided along the right side of each control 250, 270 in order to indicate the approximate color and size ranges represented by the display in the geographic window 210. When adjusted as shown in FIGS. 2 and 3, color control 270 maps a range of numerical values (in this example the number of calls to a state) to a color range or spectrum. The color range varies from dark green for the numerical range of 1 to 5, to light green for the numerical range 5 to 28. At the numerical value of 28, the color begins to shift to blue-green and becomes more blue than green until around the numerical value of 30 the color becomes totally blue. For the numerical values 30 to 79 the color ranges from light blue to deeper blue and from 79 to 290 the color ranges from dark violet to a light orchid. From the numerical values of 290 to 5,378 the color varies from red to pink, and from 5,378 to 12,092 the colors vary from pink to light pink to a very light champagne (essentially light beige). Thus, the states in FIG. 2 are colored by the color that represents the number of calls billed to a customer in that state during the period that the numerical data was gathered. In FIG. 2 the colors of the states are as described in Table 1.

TABLE 1

Figure 4:
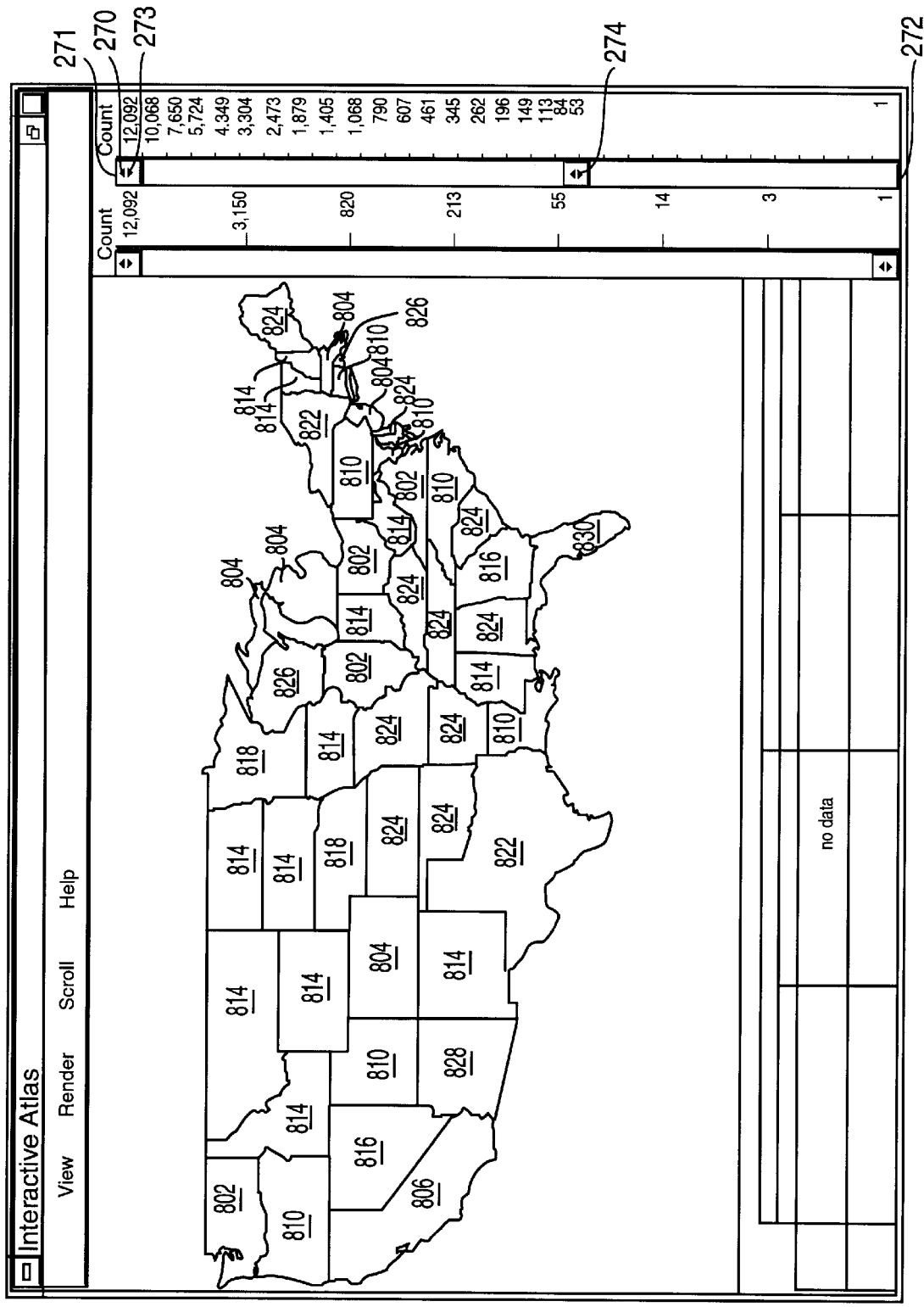
FIG. 4 illustrates the effect on FIG. 2 if the lower threshold of the color slider control is increased while the upper threshold is maintained.
Figure 5:
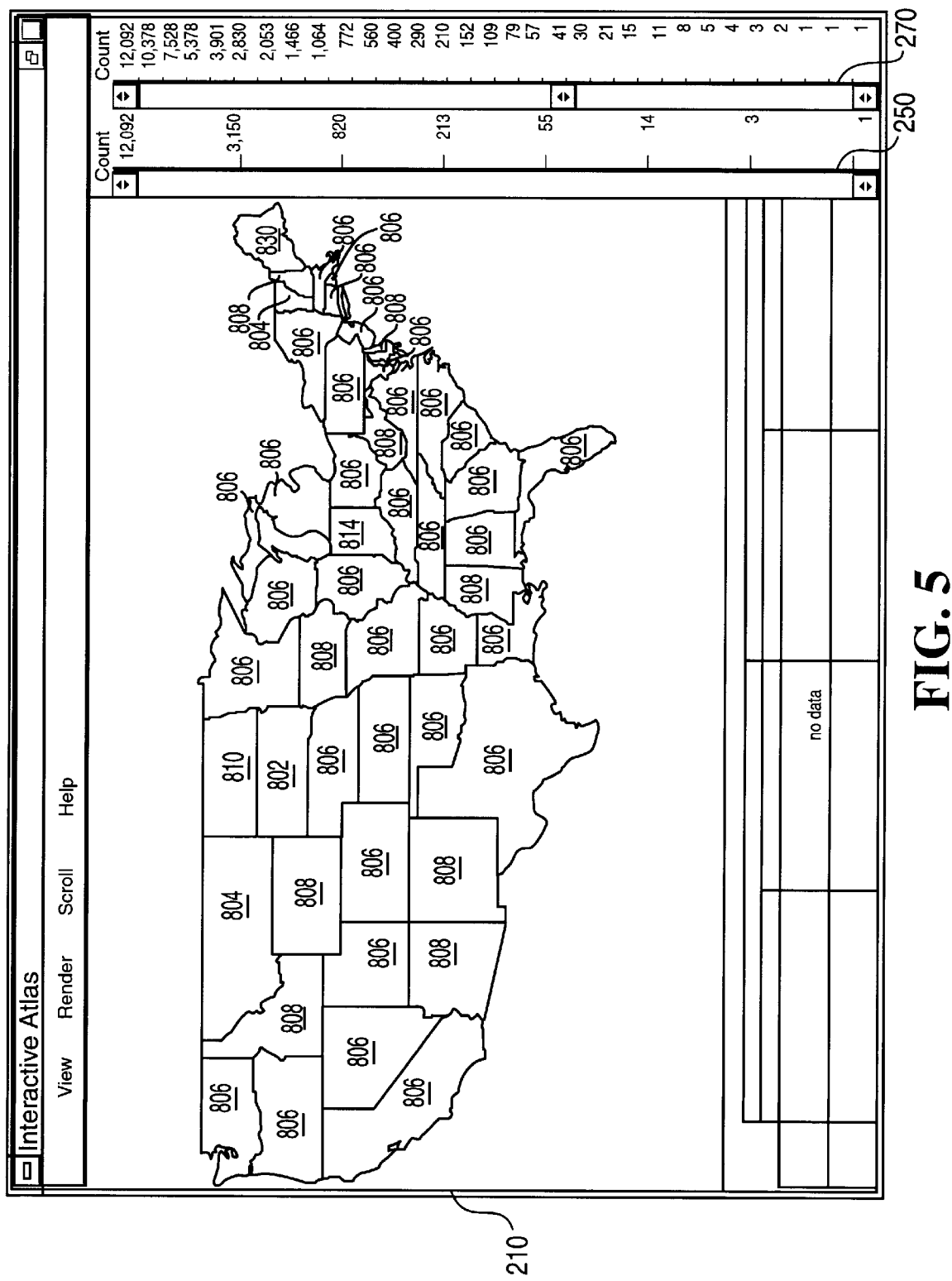
FIG. 5 illustrates the effect on FIG. 2 if the upper threshold of the color slider control is increased while the lower threshold is maintained.

|  | FIG. 2 | FIG. 4 | FIG. 5 |
| --- | --- | --- | --- |
| Alabama | orchid | lt. green | lt champagne |
| Arkansas | orchid | lt. green | lt champagne |
| Arizona | pink | lt. blue | orange |
| California | light champagne | lt. champagne | lt.champagne |
| Colorado | orange | pink | lt champagne |
| Connecticut | pink | blue | lt champagne |
| Delaware | blue | lt. green | orange |
| Florida | light orange | lt. pink | lt champagne |
| Georgia | pink | violet | lt champagne |
| Idaho | blue | dk green | orange |
| Illinois | orange | orchid | lt champagne |
| Indiana | dark green | dark green | dark green |
| Iowa | violet | dk green | orange |
| Kansas | pink | lt green | lt champagne |
| Kentucky | violet | lt green | lt champagne |
| Louisiana | orange | blue | lt champagne |
| Maine | violet | lt green | lt pink |
| Maryland | pink | blue | lt champagne |
| Massachusetts | orange | pink | lt champagne |
| Michigan | light orange | pink | lt champagne |
| Minnesota | pink | blue-green | lt champagne |
| Mississippi | blue | dk green | orange |
| Missouri | pink | lt green | lt champagne |
| Montana | blue-green | dk green | pink |
| Nebraska | violet | blue-green | lt champagne |
| New Hampshire | blue-violet | dk green | orange |
| New Jersey | orange | pink | lt champagne |
| New Mexico | blue | dk green | orange |
| New York | champagne | champagne | lt champagne |
| Nevada | orange | violet | lt champagne |
| North Carolina | pink | blue | lt champagne |
| North Dakota | dark green | dk green | blue |
| Ohio | pink | orchid | lt champagne |
| Oklahoma | orchid | lt green | lt champagne |
| Oregon | pink | blue | lt champagne |
| Pennsylvania | pink | blue | lt champagne |
| Rhode Island | blue | green | lt champagne |
| South Carolina | orchid | lt green | lt champagne |
| South Dakota | light green | dk green | orchid |
| Tennessee | violet | lt green | lt champagne |
| Texas | champagne | champagne | lt champagne |
| Utah | pink | blue | lt champagne |
| Vermont | blue-green | dk green | pink |

TABLE 1-continued

|  | FIG. 2 | FIG. 4 | FIG. 5 |
| --- | --- | --- | --- |
| Virginia | pink | orchid | lt champagne |
| Washington | orange | orchid | lt champagne |
| West Virginia | blue | dk green | orange |
| Wisconsin | orchid | green | lt champagne |
| Wyoming | blue | dk green | orange |

For a national company, it is not surprising that the most populous states, California, Texas, and New York would be the states to which the most calls are billed. Less populous states such as North Dakota and South Dakota would be expected to have a low number of calls billed. Indiana is a medium sized state, so the company whose data is being shown must not have an office in Indiana to bill. Other color spectrum could be used, such as the rainbow spectrum of violet, indigo, blue, green, yellow, orange, red.

Manipulation of upper thumb 273 and/or lower thumb 274 changes the mapping from one parameter of the data, i.e. numerical value, to another parameter of the data, i.e. the colors of the geographic regions. This technique is used where transforming from a data (e.g. numerical quantity) attribute to a graphic attribute is useful to the user. To illustrate the visual effect that this has, please refer now to FIG. 4.

In FIG. 4, lower thumb 274 has been moved toward upper thumb 273 and the upper thumb 273 has remained its previous position. The effect of this manipulation is to extend the mapping of numerical values 1–53 to dark green and map the rest of the green-champagne spectrum for numerical values 53–12,092. The colors of many of the states in geographic window 210 change in FIG. 4. The changes to the colors is given in the second column of Table 1. With this particular mapping of colors to numerical call volume, it would be very easy to locate which states had call volumes lower than the numeric value of 52 for the data base period because those states would be colored dark green in FIG. 4 with this manipulation of lower thumb 274.

In FIG. 5, it is the upper slider 273 that has been moved toward the lower slider 274 and slider 274 has remained in its position shown in FIG. 3. The effect of this manipulation is to extend the mapping of numerical values 225–12,092 to light champagne color and map the rest of the green-champagne spectrum for numerical values 1–225. The colors of a number of states in geographic window 210 have changed in FIG. 5. The changes of the colors of the states is given in the third column of Table 1. With the mapping of colors to numerical values of FIG. 5, it would be very easy to visually locate all states that had a call volume of at least 225 calls for the time period of the data base because those states would be light champagne colored in FIG. 5 with this manipulation of upper thumb 273.

Although not illustrated, movement of both thumbs 273, 274 away from their extreme positions can be accomplished. This can be done by setting the upper thumb 273 to a desired value and the lower thumb 274 to a desired value (or thumb 274 first then thumb 273 next) by use of the pointing device 116. Alternatively, one of the thumbs 273, 274 could be manipulated toward the other thumb to define a desired set range for the color spectrum of choice, and then the entire set range moved as a unit to a position where the upper thumb 273 and the lower thumb 274 have the desired values (although some fine manipulation may be needed to get the exact upper and lower value settings desired). Movement of the set range as a unit is accomplished by clicking button 117 of the pointing device 116 while the cursor 112 is located between thumbs 273, 274 within the control 270 and dragging the set range to the desired location along the range of control 270 between ends 271 and 272. As any set range is moved as a unit, the colors of the geographic regions in geographic window 210 may change in essentially real time. Thus, this is another visualization technique that a user may use to analyze numerical values from a data base.

Figure 6:
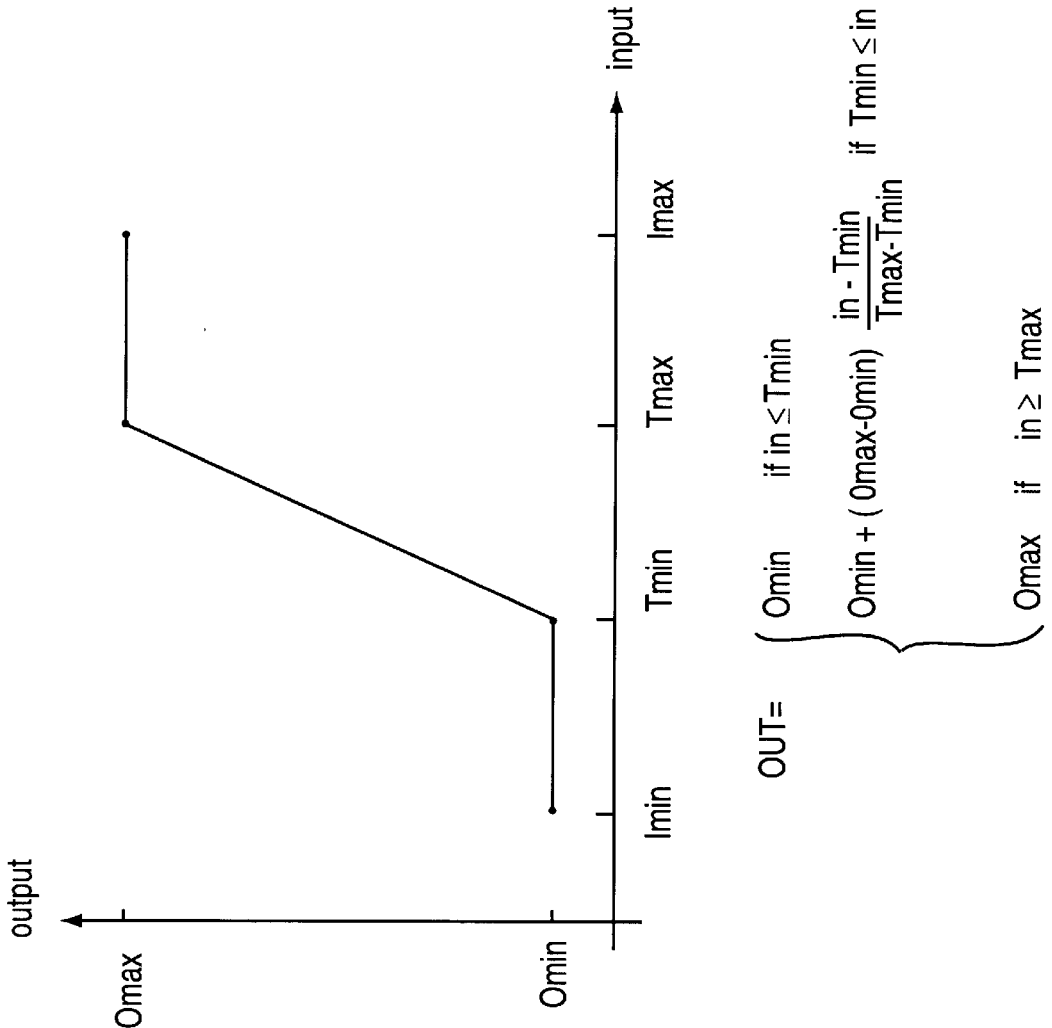
FIG. 6 is a graph showing a mapping of a range of numeric parameters to a range of visual parameters, in this case color.

FIG. 6 is a graph of a set range and how it maps colors to a set of numerical values, which may be telecommunication calls, costs, minutes or some other data parameters unrelated to telecommunications.

Figure 7:
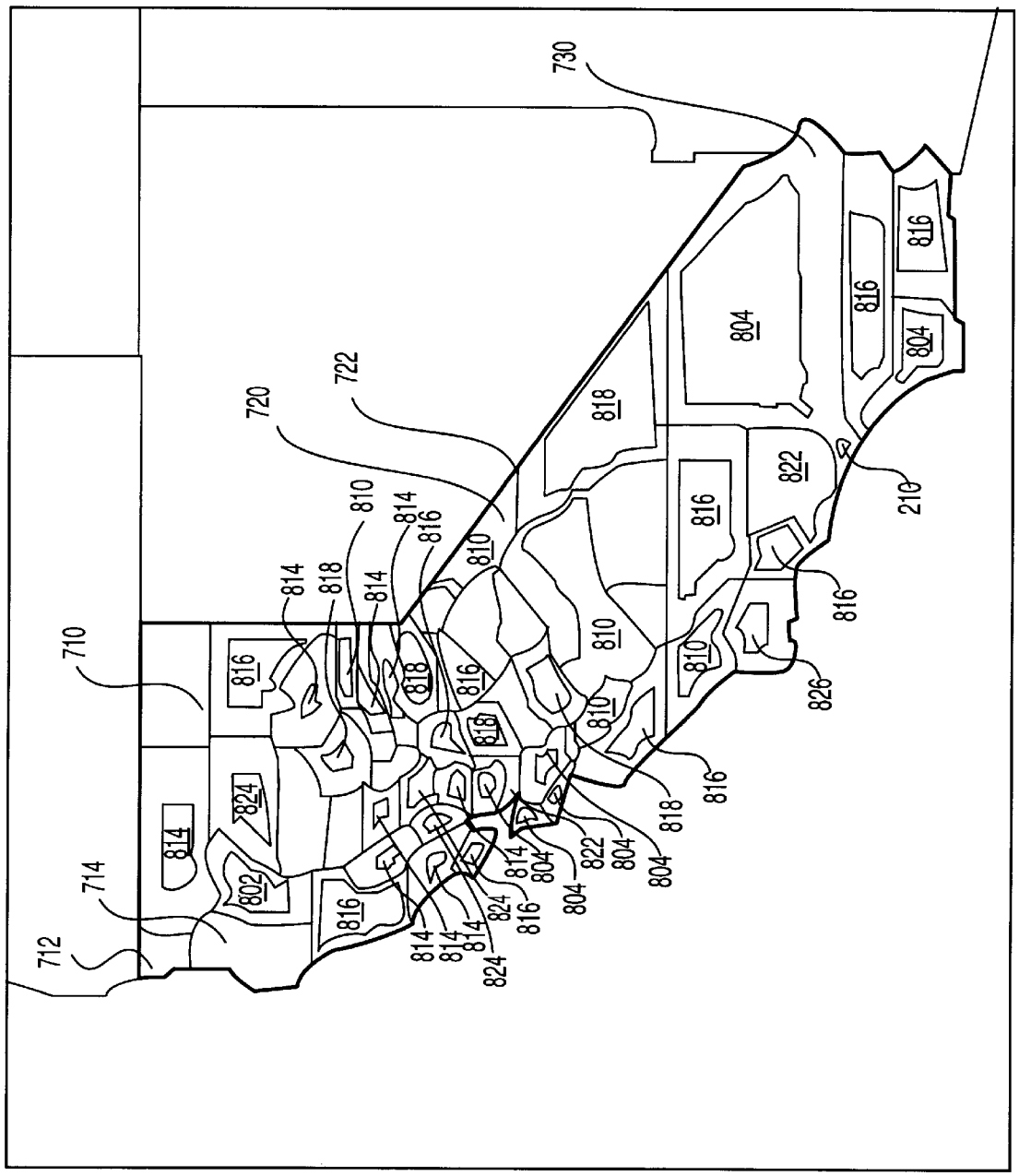
FIG. 7 illustrates the effect of the size slider control on a geographic region display.

Referring now to FIGS. 3 and 7, size control 250 will be described. Size control 250 has upper and lower ends 251, 252 and upper and lower thumbs 253, 254 which correspond very closely to the components of color control 270. The manipulation of the upper and lower thumbs 253, 254 to define a set range and the ability to move a set range as a unit are essentially the same as manipulation of corresponding components of color control 270. However, as its name implies, the size control 250 controls the size of geographic regions under analysis in geographic window 210. It should be noted that the operation of size control 250 was turned off in FIGS. 2, 4 and 5 above, although similar displays could be achieved by moving thumbs 253 and 254 to their extreme upper locations.

As shown in FIG. 7, a geographic region which is selected for analysis by the user, has an underlying geographical map of the region which is a uniform gray color except for boundaries, such as state and regional lines, which are black. Colored shapes referred to as glyphs overlay the gray map. The color of these glyphs is determined by the mapping associated with color control 270. The shape of these glyphs corresponds to the shape of the geographic region of interest. Further, each colored glyph is centered in the geographic region it over lays. The size of the glyphs are determined by the range set by upper and lower thumbs 253, 254. Thus, in FIG. 7 for the State of California, regions 710, 712 and 714 have no glyphs at all, which means they are at or below the minimum value of lower thumb 253, while glyphs 720 and 722 fill their entire regions showing that they are at or above the value of upper thumb 254. Various other regions are somewhere in between, so their glyphs only partially fill their respective regions, for example region 730. This mapping technique also gives the user visual indications of numerical values within a data base, in this case call volume by region for a specific period. To "turn off" the effect of size control 250, the user simply moves both upper and lower thumbs 253, 254 together at the upper extreme for a full size color mapped display and together at the lower extreme for no color.

Thus, it will be now be understood that there has been disclosed a method and apparatus for displaying and analyzing data of a data base. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. An apparatus for interactively transforming data according to manipulation by a human operator, comprising:

a computer system having a pointing device and a graphical user interface;

said graphical user interface having a data display region for displaying data according to a predetermined parameter;

said graphical user interface having a slider control;

said slider control having a first range which is mapped to the length of said slider control;

said slider control also having two adjustable limits within said first range which define a second range, each of said adjustable limits being individually adjustable by the user by selecting and moving using said pointing device;

said second range mapping said predetermined parameter to a second parameter;

said second range being movable within said first range by the user by selecting and dragging said second range along said first range; and movement of said second range changes the transform characteristics of said predetermined parameter into said second parameter.

2. The apparatus of claim 1, wherein said first parameter is a numerical quantity and said second parameter is a color.

3. The apparatus of claim 2, wherein said second range is a color spectrum.

4. The apparatus of claim 3 wherein said spectrum is the natural or rainbow spectrum.

5. The apparatus of claim 3 wherein said spectrum is the radiant energy versus temperature spectrum of iron.

6. The apparatus of claim 1, wherein said first parameter is a numerical quantity which is represented by a first shape and said second parameter is a size of a second shape similar to said first shape that is centered in said first shape and having a size that is at most equal to a size of said first shape.

7. The apparatus of claim 1, wherein said mapping is logarithmic.

8. The apparatus of claim 1, wherein said mapping is linear.

9. The apparatus of claim 1, wherein said first parameter is percentage range of a total file and said second parameter is location within said file.

10. The apparatus of claim 9, wherein said location is described by a coordinate within a display.

11. A method for a piecewise linear mapping of data, on a graphical user interface having a data display region for displaying data according to a predetermined parameter, having a first parameter to data having a second parameter using a slider control, said method comprising the steps of:

setting an upper limit with a first thumb of said slider control;

mapping all values of said first parameter greater than said upper limit to an upper attribute;

setting a lower limit independently of said upper limit with a second thumb of said slider control;

mapping all values of said first parameter less than said lower limit to a lower attribute; and mapping all values of said first parameter between said upper limit and said lower limit to a transform function.

12. The apparatus of claim 1, wherein said second range is moved by placing a cursor under the control of a pointing device in the second range and selecting the second range for movement by movement of a switch on the pointing device and then moving the cursor along the first range under the control of said pointing device.

13. The apparatus of claim 12, wherein said pointing device is a multi-button mouse.

14. The apparatus of claim 12, wherein said pointing device is a track-ball.

15. A method for a piecewise linear mapping of data, on a graphical user interface having a data display region for displaying data according to a predetermined parameter, having a first parameter to data having a second parameter using a slider control, said method comprising the steps of:

setting an upper limit with a first thumb of said slider control;

mapping all values of said first parameter greater than said upper limit to an upper attribute;

setting a lower limit independently of said upper limit with a second thumb of said slider control;

mapping all values of said first parameter less than said lower limit to a lower attribute; and mapping all values of said first parameter between said upper limit and said lower limit to a transform function;

wherein said transform function is a color spectrum that varies in a defined manner as said first parameter takes on values between said upper limit and said lower limit.

* * * * *

UNITED STATES PATENT AND TRADEMARK OFFICE
CERTIFICATE OF CORRECTION

PATENT NO : 5,850,531
DATED : December 15, 1998
INVENTOR(S): Kenneth Charles Cox, Stephen Gregory Eick, Dianne Kyra Hackborn, Amy Ruth Ward It is certified that error appears in the above-identified patent and that said Letters Patent is hereby corrected as shown below:

Column 3, line 20, cancel "as" and insert after "selected" -- .(period) In a colored display this is--.

Column 4, line 13, after "spectrum." cancel "The color range" and insert --The green-champagne spectrum is preferred and is made up of the following colors and the corresponding designation numbers of the colors:

| | |
|---|---|
| dark green | 814 |
| green | 826 |
| light green | 824 |
| blue-green | 818 |
| light blue | 828 |
| blue | 810 |
| blue-violet | 820 |
| violet | 816 |
| orchid | 802 |
| pink | 804 |
| light pink | 830 |
| orange | 808 |
| light orange | 812 |
| champagne | 822 |
| light champagne | 806 --. |

UNITED STATES PATENT AND TRADEMARK OFFICE
CERTIFICATE OF CORRECTION

PATENT NO : 5,850,531

DATED : December 15, 1998

INVENTOR(S): Kenneth Charles Cox, Stephen Gregory Eick, Dianne Kyra Hackborn, Amy Ruth Ward It is certified that error appears in the above-identified patent and that said Letters Patent is hereby corrected as shown below:

Column 4, line 13, before "varies" insert --The range of the colors and their corresponding designation numbers--.

Column 4, line 14, after "dark green" insert --(814)--; and after "light green" insert --(824)--.

Column 4, line 16, after "blue-green" insert --(818)--.

Column 4, line 19, after "light blue" insert --(828)--; and after "deeper blue" insert --(810)--.

Column 4, line 20, after "dark violet" insert --(816)--; and after "orchid" insert --(802)--.

Column 4, line 24, after "beige" insert --(806)--.

Column 4, line 27, after "colors" insert --and corresponding designation numbers--.

UNITED STATES PATENT AND TRADEMARK OFFICE
CERTIFICATE OF CORRECTION

PATENT NO : 5,850,531
DATED : December 15, 1998
INVENTOR(S): Kenneth Charles Cox, Stephen Gregory Eick, Dianne Kyra Hackborn, Amy Ruth Ward It is certified that error appears in the above-identified patent and that said Letters Patent is hereby corrected as shown below:

Column 4, lines 29-66 and column 5, lines 2-9, cancel entire TABLE 1 and insert the following TABLE 1:

-- TABLE 1

|   | FIG. 2 | | FIG. 4 | | FIG. 5 | |
|---|---|---|---|---|---|---|
| Alabama | orchid | (802) | lt. green | (824) | lt. champagne | (806) |
| Arkansas | orchid | (802) | lt. green | (824) | lt. champagne | (806) |
| Arizona | pink | (804) | lt. blue | (828) | orange | (808) |
| California | lt. champagne | (806) | lt. champagne | (806) | lt. champagne | (806) |
| Colorado | orange | (808) | pink | (804) | lt. champagne | (806) |
| Connecticut | pink | (804) | blue | (810) | lt. champagne | (806) |
| Delaware | blue | (810) | lt. green | (824) | orange | (808) |
| Florida | light orange | (812) | lt. pink | (830) | lt. champagne | (806) |
| Georgia | pink | (804) | violet | (816) | lt. champagne | (806) |
| Idaho | blue | (810) | dk. green | (814) | orange | (808) |
| Illinois | orange | (808) | orchid | (802) | lt. champagne | (806) |
| Indiana | dark green | (814) | dark green | (814) | dark green | (814) |
| Iowa | violet | (816) | dk. green | (814) | orange | (808) |
| Kansas | pink | (804) | lt. green | (824) | lt. champagne | (806) |
| Kentucky | violet | (816) | lt. green | (824) | lt. champagne | (806) |
| Louisiana | orange | (808) | blue | (810) | lt. champagne | (806) |
| Maine | violet | (816) | lt. green | (824) | lt. pink | (830) |
| Maryland | pink | (804) | blue | (810) | lt. champagne | (806) |
| Mass. | orange | (808) | pink | (804) | lt. champagne | (806) |
| Michigan | light orange | (812) | pink | (804) | lt. champagne | (806) |
| Minnesota | pink | (802) | blue-green | (818) | lt. champagne | (806) |
| Mississippi | blue | (810) | dk. green | (814) | orange | (808) |
| Missouri | pink | (804) | lt. green | (824) | lt. champagne | (806) |
| Montana | blue-green | (818) | dk. green | (814) | pink | (804) |

UNITED STATES PATENT AND TRADEMARK OFFICE
CERTIFICATE OF CORRECTION

PATENT NO : 5,850,531

DATED : December 15, 1998

INVENTOR(S): Kenneth Charles Cox, Stephen Gregory Eick, Dianne Kyra Hackborn, Amy Ruth Ward It is certified that error appears in the above-identified patent and that said Letters Patent is hereby corrected as shown below:

| | | | | | |
|---|---|---|---|---|---|
| Nebraska | violet | (816) | blue-green | (818) | lt. champagne (806) |
| New Hamp. | blue-violet | (820) | dk. green | (814) | orange (808) |
| New Jersey | orange | (808) | pink | (804) | lt. champagne (806) |
| New Mexico | blue | (810) | dk. green | (814) | orange (808) |
| New York | champagne | (822) | champagne | (822) | lt. champagne (806) |
| Nevada | orange | (808) | violet | (816) | lt. champagne (806) |
| N. Carolina | pink | (804) | blue | (810) | lt. champagne (806) |
| N. Dakota | dark green | (814) | dk. green | (814) | blue (810) |
| Ohio | pink | (804) | orchid | (802) | lt. champagne (806) |
| Oklahoma | orchid | (802) | lt. green | (824) | lt. champagne (806) |
| Oregon | pink | (804) | blue | (810) | lt. champagne (806) |
| Penn. | pink | (804) | blue | (810) | lt. champagne (806) |
| R. I. | blue | (810) | green | (826) | lt. champagne (806) |
| S. Carolina | orchid | (802) | lt. green | (824) | lt. champagne (806) |
| S. Dakota | light green | (824) | dk. green | (814) | orchid (802) |
| Tennessee | violet | (816) | lt. green | (824) | lt. champagne (806) |
| Texas | champagne | (822) | champagne | (822) | lt. champagne (806) |
| Utah | pink | (804) | blue | (810) | lt. champagne (806) |
| Vermont | blue-green | (818) | dk. green | (814) | pink (804) |
| Virginia | pink | (804) | orchid | (802) | lt. champagne (806) |
| Wash. | orange | (808) | orchid | (802) | lt. champagne (806) |
| W. Virginia | blue | (810) | dk. green | (814) | orange (808) |
| Wisconsin | orchid | (802) | green | (826) | lt. champagne (806) |
| Wyoming | blue | (810) | dk. green | (814) | orange (808)--. |

UNITED STATES PATENT AND TRADEMARK OFFICE
CERTIFICATE OF CORRECTION

PATENT NO : 5,850,531
DATED : December 15, 1998
INVENTOR(S): Kenneth Charles Cox, Stephen Gregory Eick, Dianne Kyra Hackborn, Amy Ruth Ward It is certified that error appears in the above-identified patent and that said Letters Patent is hereby corrected as shown below:

Column 5, line 31, after "dark green" insert --(814)--.

Column 5, line 35, cancel "is" and insert --and corresponding designation numbers are--.

Column 5, line 39, after "dark green" insert --(814)--.

Column 5, line 48, after "the colors" insert --and corresponding designation numbers--; and cancel "is" and insert --are--.

Column 6, line 32, cancel "color of these glyphs is" and insert --colors and corresponding designation numbers of these glyphs are--.

Signed and Sealed this

Fourteenth Day of March, 2000

Attest:

Q. TODD DICKINSON

Attesting Officer

Commissioner of Patents and Trademarks